United States Patent [19]

Pors et al.

[11] Patent Number: 5,019,410

[45] Date of Patent: May 28, 1991

[54] YEAST PACKAGE

[75] Inventors: Teresa H. Pors, Delft; Johannes B. Van Der Plaat, Leiderdorp, both of Netherlands

[73] Assignee: Gist-Brocades NV, Delft, Netherlands

[21] Appl. No.: 286,949

[22] PCT Filed: Mar. 30, 1988

[86] PCT No.: PCT/NL88/00014

§ 371 Date: Feb. 2, 1989

§ 102(e) Date: Feb. 2, 1989

[87] PCT Pub. No.: WO88/07482

PCT Pub. Date: Oct. 6, 1988

[30] Foreign Application Priority Data

Apr. 2, 1987 [EP] European Pat. Off. ........... 87200613

[51] Int. Cl.$^5$ ................................................ C12G 1/00
[52] U.S. Cl. .......................................... 426/8; 426/15; 426/13; 426/592; 426/112; 215/355; 215/277; 215/316
[58] Field of Search ...................... 426/7, 11, 15, 592, 426/106, 8, 112; 215/355, 273, 277, 296, 316

[56] References Cited

U.S. PATENT DOCUMENTS

B 394,742 4/1976 Spooner .
4,009,285 2/1977 Spooner .

FOREIGN PATENT DOCUMENTS 0133346 2/1985 European Pat. Off. .
0236751 9/1987 European Pat. Off. .

OTHER PUBLICATIONS

"The Technology of Wine Making", by Amerine et al., 4th Ed., Avi Pub. Co., Inc., pp. 451–490.

*Primary Examiner*—Marianne Cintins
*Attorney, Agent, or Firm*—Fleit, Jacobson, Cohn, Price, Holman & Stern

[57] ABSTRACT

A yeast package is provided which can be used during the second fermentation in a bottle for the production of sparkling wines starting from basic wine containing sugar. A drastic reduction in time and in labor is possible due to easy separation of yeast and beverage.

17 Claims, No Drawings

YEAST PACKAGE

The invention relates to yeast immobilized in a package which may be used in the fermentation in a bottle for the production of sparkling wines starting from basic wine containing sugar. The production of sparkling wines was already known in the 18th century. Traditionally sparkling wines are prepared by refermentation in bottles of a basic wine containing sugar. Sparkling wines are defined throughout the specification as wines having a pressure of more than 0.5 bar (= 1.5 bar absolute) at 10° C.

Sparkling wines contain an excess of carbon dioxide. The source of the carbon dioxide may be the excess carbon dioxide from fermentation of sugar after the fermentation process. This sugar may be residual sugar or it may advantageously be added to the liquid in a predetermined quantity. The fermented wine used for the second fermentation generally contains less than 10–11.5% alcohol. If the alcohol content is higher it will be difficult to secure satisfactory fermentation in the bottle. If it is too low the wine will not keep well and the addition of brandy may be necessary to attain the proper alcohol content in the final product. After the second fermentation which may take place during, for example, 9 months, in the bottle, the yeast sediment has to be removed from the bottle. In order to get the yeast onto the cork, the bottles are placed upside down in racks with the bottles nearly vertical, necks downward and the bottles are daily turned. A coarse granular sediment may move onto the cork within a week, others may need a month or more. At the end of this operation the wine in the bottles is cooled to reduce the pressure in the bottle and the precipitate is frozen as a small plug in the neck of the bottle next to the cork. The cork is removed and, the pressure in the bottle forces out the ice plug.

It is an object of the invention to provide yeast in a package which may be used in the fermentation in a bottle for the production of sparkling wines starting from basic wine containing sugar. It is another object of the invention to provide a method to remove the yeast from the bottle after the second fermentation.

These and other objects together with the advantages of the invention will become obvious from the following description.

As described above and in more detail by e.g. M.A. Amerine et al., The Technology of Wine Making, 4th edition, The Avi Publishing Company, Inc., Westport, CN, USA, page 451–490, the yeast has to be substantially removed from the bottle after the second fermentation. The turning of the bottles each day during 1–4 weeks costs a lot of time and labour.

The invention provides a permeable package containing 1–500 mg yeast (dry matter) which comprises a water resistant filter material which prevents the yeast from growing through the filter material during a fermentation process and which filter material is, independent of pressure during said fermentation process, permeable for water, alcohol, glucose, nutrients and carbonates and/or dissolved carbon dioxide. By using the package according to the present invention a drastic reduction in space, time and labour is possible. The package contains the yeast necessary for the second fermentation. The package will contain approximately 1500 mg yeast, advantageously 20–100 mg per package. All given yeast weights relate to dry matter. If necessary, up to twice the amount of yeast is added compared to the amount used in conventional processes. The advantages of the present process more than counterbalance the disadvantage of the addition of extra yeast.

By using a yeast enclosed in a package instead of free flowing yeast in the second fermentation sedimentation of the yeast is possible within one day, advantageously within one hour or immediately. Substantially no time-consuming turning of the bottle is necessary to promote the settlement of the yeast. The package itself is advantageously provided with a material which shows good permeability properties for water, ethanol, glucose and nutrients, while the pores or openings of the filter material are small enough to keep the yeast inside the package. DE-C-708253, EP-A-133346, US-4009285 all describe the use of filter materials. The yeast is described as incorporated in a package comprising a porous membrane such as polyvinylchloride. In order to keep the yeast cells in the package the pores in the membrane have to be very small.

EP-A-236751 describes that when using the materials disclosed in the above three patent documents, even when using small pores the yeast will grow through the membranes, to the outside of the filter and then into the liquid of the bottle. Moreover, the preferred final pressure of 5 bar was not obtained. When the package was removed, due to high pressure present in this package, the membrane of the package often bursted.

In order to keep the yeast inside the package without substantial growth outside the package, the filter material chosen shall have very small pores and at the same time good permeability properties in relation to the water, ethanol, glucose and nutrients. The choice of such materials leads to polar filter materials. However, these polar filter materials have rather bad carbon dioxide permeating properties and gas build-up in the container occurs. This formed carbon dioxide was lead away from the container via special constructions or by using at least in part filter surface area of an apolar membrane as is shown in, for example EP-A-236751 and EP-A-210915. When not using such an outlet for the carbon dioxide, this gas remains in the package and the package may burst during the disgorging of the bottle.

Surprisingly it has been found that when certain filter materials were used for the yeast package, the yeast will not grown to the outside during the second fermentation. During the second fermentation no substantial yeast growth is noticed then outside the package. Moreover, the carbon dioxide is removed, at least partly, through this filter material in the form of carbonate and/or dissolved carbon dioxide. The removal of the formed carbon dioxide in the form of carbonate or dissolved carbon dioxide was insufficient in the methods described in the state of art because of the nature of the filter materials.

According to the invention the filter material comprises polar materials such as filter paper or cellulose derived filter materials (e.g. cellulose acetate). When using rather thin filter material, growth of the yeast to the outside of the filter was noticed. The occurrence of yeast outside the yeast package is prevented, not by choosing other or newly developed materials having smaller pores, but by a thicker suitable filter material. The pathway for the yeast to grow through the filter is lengthened and it took considerably more time for the yeast to pass the filter material (labyrinth filter). The insight into this solution, leads to the use of preferably filter paper with a suitable thickness of at least 0.12 mm. The filter paper has to be water resistant.

In general the filter material can be characterized as having at least a retention for the yeast cells corresponding with the retention of 140 g/m$^2$ Whatmann 50 ® filter paper when pressing an aqueous yeast suspension 0.25% dry weight or 10$^8$ yeast cells/ml with air of 6 bar.

By choosing the filter material according to the invention the diffusion of water, ethanol, glucose or nutrients through the filter will be sufficient and the fermentation will be completed within the desired time limit.

By the direct discharge of carbon dioxide in carbonate form and/or dissolved carbon dioxide independent of pressure, the fermentation even may be stimulated.

Therefore the filter material, independent of pressure, is permeable for water, alcohol, glucose, nutrient carbonates and/or dissolved carbon dioxide. This independency is found to be present up to at least 6 bar.

The package is preferably in the form made of a sachet which comprises the use of a suitable filter material in which is enclosed a suitable yeast. The yeast sachet may advantageously be incorporated in a cartridge which is placed in the neck of the bottle and which is easily removable and exchangeable. After filling the sachet with the proper amount of yeast the sachet is sealed. Therefore, besides being permeable to solutes in the wet state, the sachets in dry state have to be closeable or sealable, preferably by local heating. Normally the sachet's material will be acceptable for use in contact with beverages. Natural materials as well as suitable other materials such as plastics may be used. Preferably membranes or membrane like materials are used having openings or pores sizes of 0.005-10 $\mu$m, more preferably 0.1-1 $\mu$m. The permeability of the sachet is obtained for example by using a material having a "natural" fiber structure, or may be obtained by using materials consisting of woven fibers or may be obtained by perforating suitable materials. Suitably the sachet has a volume not larger than 5 ml, preferably not larger than 2 ml, and is designed in a way which makes the removal, as described hereafter, possible.

At the end of the fermentation the sachets will be easily removable by a procedure which is less laborious than the existing ones.

Suitably the sachet will be placed in a cartridge fixed in the neck of the bottle underneath the crown-cork.

Presently a lot of wineries use crown caps as cork during the second fermentation. These crown caps are cheap, give fewer "leakers" and are easy to remove for disgorging. Using a crown cap or another cork during the second fermentation the sachet may be free flowing in the bottle, or locked in a cartridge which advantageously has large openings and no extra substantial diffusion limitation will occur due to this cartridge.

In another embodiment of the invention the sachet may be incorporated in the cork. Advantageously a plastic cork is used, preferably the cork is hollow. When the sachet is incorporated in the cork or in the cartridge, the bottle has to be situated in a way that the sachet is contained in the fermentation liquid.

The cork or cap and the bottle have to withstand at least the CO$_2$-pressure formed during the second fermentation. The pressure desired in sparkling wines at the end of the closed fermentation is commonly about 5 to 6 atm. at 15° C.

By using free flowing sachets, the sachets will rapidly sediment into the bottle's neck upon turning. They may be removed using the methods known per se for the removal of the free flowing yeast sediment. By incorporating the yeast sachet into a cap or cork, or by making the yeast sachet easily removable, for example, by locking the sachet in a cartridge, the yeast sachet can be advantageously removed without freezing the neck of the bottle, resulting in a minimal loss of liquid. Preferably the bottles are first cooled to reduce the pressure. By this cooling the loss of carbon dioxide is minimal.

The yeast used in the sachet may be produced by methods known per se. Preferably a dried yeast or instant yeast is used. Not only the commonly applied and available yeasts can be used but also other suitable yeasts missing the necessary flocculation properties. The lack of the flocculation properties makes application in conventional processes disadvantageous.

If dried yeasts are used the sachets may be bulk-packed, protected from moisture and oxygen. The sachets may for example be vacuum-packed. An advantage is that the shelf-life of sachets in original packing will be at least six months. Optionally the sachet contains a minute amount of rehydration promoting agent (for example glucose).

Additives which are commonly applied during the second fermentation are optionally added together with yeast in the sachet, to the liquid to be fermented.

Before the second fermentation starts, the glucose and/or saccharose and other usual additives can be added besides the yeast. In classic champagne making after the second fermentation, when the yeast is removed from the bottle, sufficient liquid, preferably wine or liqueur is added to replace the loss in disgorging. Using the sachet of the invention, the loss of liquid during disgorging is minimal, less than 0.5 ml.

Optionally other additives may be added at the same time, for example compounds to prevent refermentation. Hereafter the bottle is then corked and preferably the cork is wired down in the characteristic manner.

In the following examples there are described several preferred embodiments to illustrate the invention. However, it should be understood that the invention is not intended to be limited to the specific embodiments.

EXAMPLE 1

110 g of saccharose, 60 mg of (NH$_4$)$_2$HPO$_4$ and 60 mg of MgSO$_4$.7H$_2$O were dissolved in 4500 ml of water. By adding citric acid a pH of 3.5 was obtained. 675 ml of this medium, introduced into a suitable wine-bottle, was sterilized at 110° C. for 30 minutes. Hereafter 75 ml of ethanol were added to obtain a medium containing 9.6% alcohol.

A sachet consisting of a dialysis material (Visking ®), which contained 40 mg of a commercially available dried wine yeast (*Saccharomyces cerevisiae* var. *bayanus*) was introduced into the bottle. Finally the bottle was closed with a manometer. The bottle was maintained in vertical position at 18° C. The pressure increase was measured for 25 days. The results are shown in Table 1.

TABLE 1

| day | pressure (atm.)* | day | pressure (atm.)* |
| --- | --- | --- | --- |
| 0 | 0 | 16 | 1.25 |
| 7 | 0.3 | 19 | 1.50 |
| 8 | 0.4 | 20 | 1.60 |
| 9 | 0.5 | 22 | 1.70 |
| 12 | 0.75 | 25 | 1.95 |
| 13 | 0.9 | | |
| 14 | 0.9 | | |

TABLE 1-continued

| day | pressure (atm.)* | day | pressure (atm.)* |
|---|---|---|---|
| 15 | 1.15 | | |

*the values given are the mean values of 2 experiments.

After 25 days the yeast sachet was removed and the medium was visually clear and free of flocculations.

EXAMPLE 2

From a bottle (700 ml) of "Silvaner" trocken basic wine (11% alcohol, 30 ppm $SO_2$), 25 ml was removed and replaced by 30.8 ml of medium containing 15.4 g of glucose resulting in a starting liquid containing 10.5% alcohol.

Several experiments were carried out at 18° C.:

(a) experiments in which a polyamide (flat membrane) sachet of 1×5 cm was used containing 100 mg of dried yeast (b) experiments in which 40 mg of dried yeast were suspended and consequently added to the liquid.

The yeast suspension was prepared by mixing dried yeast with wine. The yeast was similar to the yeast used in Example 1. The sachets used in (a) were free floating in the liquid of the vertically placed bottle. The sachet was positioned in the upper part of the liquid. In experiment (b) the bottle was also placed vertically. The results of (a) and (b) are given in Table 2. Pressure measurements were the same as in Example 1. In experiment (a) no increase in pressure was observed after 30 days. During disgorging half of the polyamid sachets bursted, apparently caused by retained carbon dioxide.

TABLE 2

| (a) | | (b) | |
|---|---|---|---|
| day | pressure (atm.)* | day | pressure (atm.)* |
| 0 | 0 | 0 | 0 |
| 1 | 0.35 | 5 | 0 |
| 4 | 0.55 | 9 | 0 |
| 5 | 0.61 | 15 | 0.4 |
| 6 | 0.73 | 18 | 1.0 |
| 7 | 0.85 | 21 | 1.8 |
| 8 | 0.93 | 26 | 2.5 |
| 11 | 1.31 | 53 | 6.3 |
| 12 | 1.44 | | |
| 13 | 1.55 | | |
| 18 | 2.15 | | |
| 53 | 2.95 | | |

*the values given are the mean values of 2 experiments.

EXAMPLE 3

Bottles containing basic wine with glucose addition were prepared as in Example 2.

Several experiments were carried out at 11° C.;

(a) experiments in which a filter paper sachet of 1.4×4.0 cm was used containing 100 mg of commercially available dried yeast.

(b) experiments in which 40 mg of dried yeast were suspended and consequently added to the liquid.

The yeast suspension was again prepared by mixing dried yeast with wine. For pressure measurements the sachets used in (a) were positioned at the bottom of the vertically placed bottle. In experiment (b) the bottle was also placed vertically. A pressure gauge was fixed in the neck of the bottles. The results of (a) and (b) are given in Table 3.

TABLE 3

| (a) | | (b) | |
|---|---|---|---|
| day | pressure (atm.)* | day | pressure (atm.)* |
| 0 | 0 | 0 | 0 |
| 14 | 0.40 | 14 | 0.60 |
| 21 | 0.90 | 21 | 1.22 |
| 31 | 1.55 | 31 | 1.84 |
| 39 | 1.90 | 38 | 2.21 |
| 48 | 2.17 | 48 | 2.47 |
| 55 | 2.65 | 55 | 2.77 |
| 62 | 3.00 | 62 | 2.90 |
| 69 | 3.22 | 69 | 3.00 |
| 80 | 3.50 | 79 | 3.20 |
| 90 | 3.80 | 90 | 3.30 |

*the values given are the mean values of 2 experiments.

We claim:

1. Permeable package containing 1–500 mg yeast (dry matter) comprising a water-resistant filter material having a thickness of at least 0.12 mm which prevents the yeast from growing through the filter material during a fermentation process, and wherein the filter material is, independent of pressure during said fermentation process, permeable for water, alcohol, glucose, nutrients and carbonates and/or dissolved carbon dioxide.

2. Package according to claim 1 containing 20–100 mg yeast (dry matter).

3. Package according to claim 1 containing dried 15 yeast.

4. Package according to claim 1 comprising a filter material having pores or openings of 0.005–10 μm.

5. Package according to claim 1 in the form of a sachet which comprises yeast enclosed in sealed filter material.

6. Method for a fermentation in a bottle comprising the steps of:
   inserting a sachet according to claim 5 in a bottle of wine containing sugar;
   corking the bottle; and
   fermenting the sugar present in the bottle by the action of the yeast present in the sachet such that a sparkling wine is formed which has a pressure of more than 0.5 bar at 10° C.

7. Method of claim 6 further comprising the step of removing the sachet after the fermentation is complete.

8. Method for a second fermentation in a bottle comprising the steps of:
   inserting a yeast package according to claim 1, in a bottle of wine containing sugar;
   corking the bottle; and
   fermenting the sugar present in the bottle by the action of the yeast present in the package such that a sparkling wine is formed which has a pressure of more than 0.5 bar at 10° C.

9. Method of claim 8, further comprising the step of removing the yeast package after the second fermentation is complete.

10. Cork or cartridge comprising a package according to claim 1.

11. Method for a fermentation in a bottle comprising the steps of:
    inserting a cork or cartridge according to claim 8 in a bottle of wine containing sugar, wherein the cork or cartridge is submerged in the wine;
    corking the bottle; and
    fermenting the sugar present in the bottle by the action of the yeast present in the cork or cartridge such that a sparkling wine is formed which has a pressure of more than 0.5 to 10° C.

12. Method according to claim 11 in which a cartridge is used which is situated in the neck of the bottle during the fermentation.

13. Method of claim 11 further comprising the step of removing the cork or cartridge after the fermentation is complete.

14. The package of claim 1, further comprising a rehydration promoting agent.

15. The package of claim 1, wherein the filter material has pores or openings of 0.1-1 $\mu$m.

16. The package of claim 1, wherein the filter material has a particle retention in liquid of at least 2.7 $\mu$m.

17. The package of claim 1, wherein the filter material is made of cellulose.

* * * * *